(12) United States Patent
Tsuchiya

(10) Patent No.: US 11,073,890 B2
(45) Date of Patent: Jul. 27, 2021

(54) IMAGE FORMING SYSTEM INCLUDING IMAGE FORMING APPARATUSES, MANAGING DEVICE AND USER TERMINAL WHICH SELECTS IMAGE FORMING APPARATUS AND RECEIVES INSTRUCTION TO SHIFT TO NORMAL MODE FROM POWER SAVING MODE

(71) Applicant: KYOCERA Document Solutions Inc., Osaka (JP)

(72) Inventor: Masaki Tsuchiya, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 16/847,395

(22) Filed: Apr. 13, 2020

(65) Prior Publication Data

US 2020/0341535 A1    Oct. 29, 2020

(30) Foreign Application Priority Data

Apr. 25, 2019  (JP) .............................. JP2019-083601

(51) Int. Cl.

| G06F 1/3234 | (2019.01) |
|---|---|
| G06F 1/3231 | (2019.01) |
| G06F 3/12 | (2006.01) |
| G03G 15/00 | (2006.01) |

(Continued)

(52) U.S. Cl.
CPC .......... *G06F 1/3231* (2013.01); *G06F 1/3284* (2013.01); *G06F 3/1286* (2013.01); *G03G 15/5004* (2013.01); *G06F 1/26* (2013.01); *G06F 1/3203* (2013.01)

(58) Field of Classification Search
None
See application file for complete search history.

(56) References Cited

U.S. PATENT DOCUMENTS

| 8,027,046 B2 * | 9/2011 | Yamasaki | ............. G06F 1/3287 358/1.14 |
|---|---|---|---|
| 2004/0246512 A1 * | 12/2004 | Miyamoto | ......... H04N 1/00079 358/1.13 |

(Continued)

FOREIGN PATENT DOCUMENTS

JP    2014-218003 A    11/2014

*Primary Examiner* — Haris Sabah
(74) *Attorney, Agent, or Firm* — Studebaker & Brackett PC

(57) ABSTRACT

An image forming system includes image forming apparatuses connected to a network, a managing device connected to the network and being communicable with the image forming apparatuses, and user terminals communicable with the network. The image forming apparatuses are respectively connected to local area networks in the network. Each image forming apparatus is set to any of a normal mode, a sleep mode with power consumption less than the normal mode and an energy saving mode with power consumption less than the sleep mode. The managing device counts the number of the user terminals connected to the same local area network as the image forming apparatus and, if the counted number is less than a threshold value, transmits an energy saving shift instruction to the image forming apparatus. The image forming apparatus sets to the energy saving mode, if receiving the energy saving shift instruction from the managing device.

7 Claims, 4 Drawing Sheets

(51) Int. Cl.
*G06F 1/3203* (2019.01)
*G06F 1/26* (2006.01)

(56) References Cited

U.S. PATENT DOCUMENTS

| | | | | |
|---|---|---|---|---|
| 2008/0174819 A1* | 7/2008 | Hada | ................... | G06F 3/127 |
| | | | | 358/1.15 |
| 2012/0011385 A1* | 1/2012 | Sugiyama | .......... | H04N 1/00222 |
| | | | | 713/323 |
| 2013/0246823 A1* | 9/2013 | Imaizumi | .............. | G06F 1/3284 |
| | | | | 713/323 |
| 2013/0250329 A1* | 9/2013 | Satoh | ....................... | G06F 3/126 |
| | | | | 358/1.13 |
| 2014/0078531 A1* | 3/2014 | Park | ................... | H04N 1/00954 |
| | | | | 358/1.13 |
| 2015/0293728 A1* | 10/2015 | Nishimura | ............ | G06F 3/1221 |
| | | | | 358/1.15 |

* cited by examiner

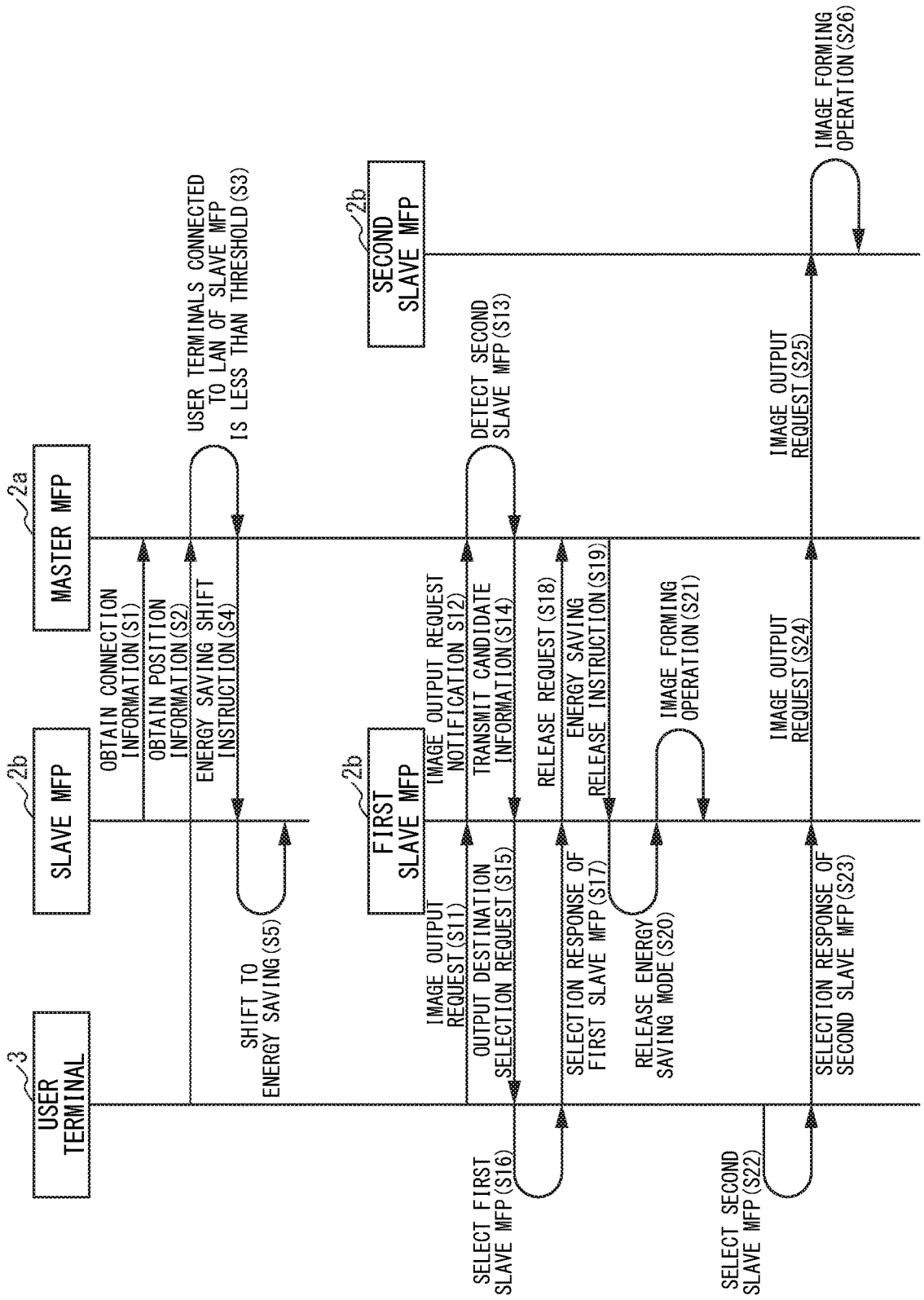

IMAGE FORMING SYSTEM INCLUDING IMAGE FORMING APPARATUSES, MANAGING DEVICE AND USER TERMINAL WHICH SELECTS IMAGE FORMING APPARATUS AND RECEIVES INSTRUCTION TO SHIFT TO NORMAL MODE FROM POWER SAVING MODE

INCORPORATION BY REFERENCE

This application is based on and claims the benefit of priority from Japanese Patent application No. 2019-083601 filed on Apr. 25, 2019, the entire contents of which are incorporated herein by reference.

BACKGROUND

The present disclosure relates to an image forming system including a plurality of image forming apparatuses connected to a predetermined network.

Conventionally, an image forming apparatus, such as a multifunction peripheral or a printer, is connected to a predetermined network, such as an intracompany local area network (LAN), and communicably connected to a user terminal, such as a personal computer, via the network. Moreover, in an image forming system configured by connecting a plurality of image forming device to such a network, the user terminal optionally selects the image forming apparatus to transmit an image output instruction, and the selected image forming apparatus carries out image output in accordance with this image output instruction. In such an image forming system, because power consumption is increased, if all of the image forming apparatuses are activated, the image forming apparatus not used for a predetermined time waits after shifting from a normal mode for a normal operation to a sleep mode reducing the power consumption.

For example, there is a known image forming system, wherein a first image forming apparatus on the master side and a second image forming apparatus on the slave side are connected via a wired network, and the first image forming apparatus and the second image forming apparatus are connected to a terminal device (a user terminal) via a wireless network. The first image forming apparatus includes a standby state storing part, a controlling part and a wired communicating part. The standby state storing part stores whether or not a standby state of the second image forming apparatus is an energy saving standby state (a sleep mode) stopping power supply to a wireless communicating part of the second image forming apparatus. The controlling part decides whether or not a print job transmitted from the terminal device via the wireless network is a print job to the second image forming apparatus in the energy saving standby state. The wired communicating part communicates with the second image forming apparatus via the wired network. When the controlling part decides that the print job is the print job to the second image forming apparatus and decides by the standby state storing part that the second image forming apparatus is in the energy saving standby state, the controlling part controls the wired communicating part to transmit a return instruction to return from the energy-saving standby state to the second image forming apparatus via the wired network. When the second image forming apparatus receives the return instruction from the first image forming apparatus via the wired network, the second image forming apparatus starts power supply to the wireless communicating part and receives the print job by the wireless communicating part.

In the above-mentioned image forming system, the master image forming apparatus decides the standby state of the slave image forming apparatus and, when the print job is addressed to the slave image forming apparatus in the sleep mode, transmits the return instruction to the slave image forming apparatus. However, in a case where the forming apparatus is returned from the sleep mode to the normal mode, the forming apparatus consumes much power in order to activate each component. Therefore, in a case where the image forming apparatuses communicated with the LAN making the image forming apparatus operational is little and frequency of transmitting the image output instruction to the image forming apparatus is low, a problem deteriorating energy saving efficiency is caused.

SUMMARY

An image forming system of the present disclosure includes one or more image forming apparatuses connected to a predetermined network; a managing device connected to the network and being communicable with the one or more image forming apparatuses; and one or more user terminals being communicable with the network. The one or more image forming apparatuses are respectively connected to one or more local area networks in the network. Each image forming apparatus is set to any operation mode of a normal mode, a sleep mode with power consumption less than the normal mode and an energy saving mode with power consumption less than the sleep mode. The managing device counts the number of the user terminals connected to the same local area network as the image forming apparatus and, in a case where the counted number is less than a predetermined threshold value, transmits an energy saving shift instruction to the image forming apparatus. The image forming apparatus sets the operation mode to the energy saving mode, in a case of receiving the energy saving shift instruction from the managing device.

The above and other objects, features, and advantages of the present disclosure will become more apparent from the following description when taken in conjunction with the accompanying drawings in which a preferred embodiment of the present disclosure is shown by way of illustrative example.

BRIEF DESCRIPTION OF THE DRAWINGS

FIG. 4 is a flow chart showing operation in the image forming system according the first embodiment of the present disclosure.

DETAILED DESCRIPTION

Figure 1:
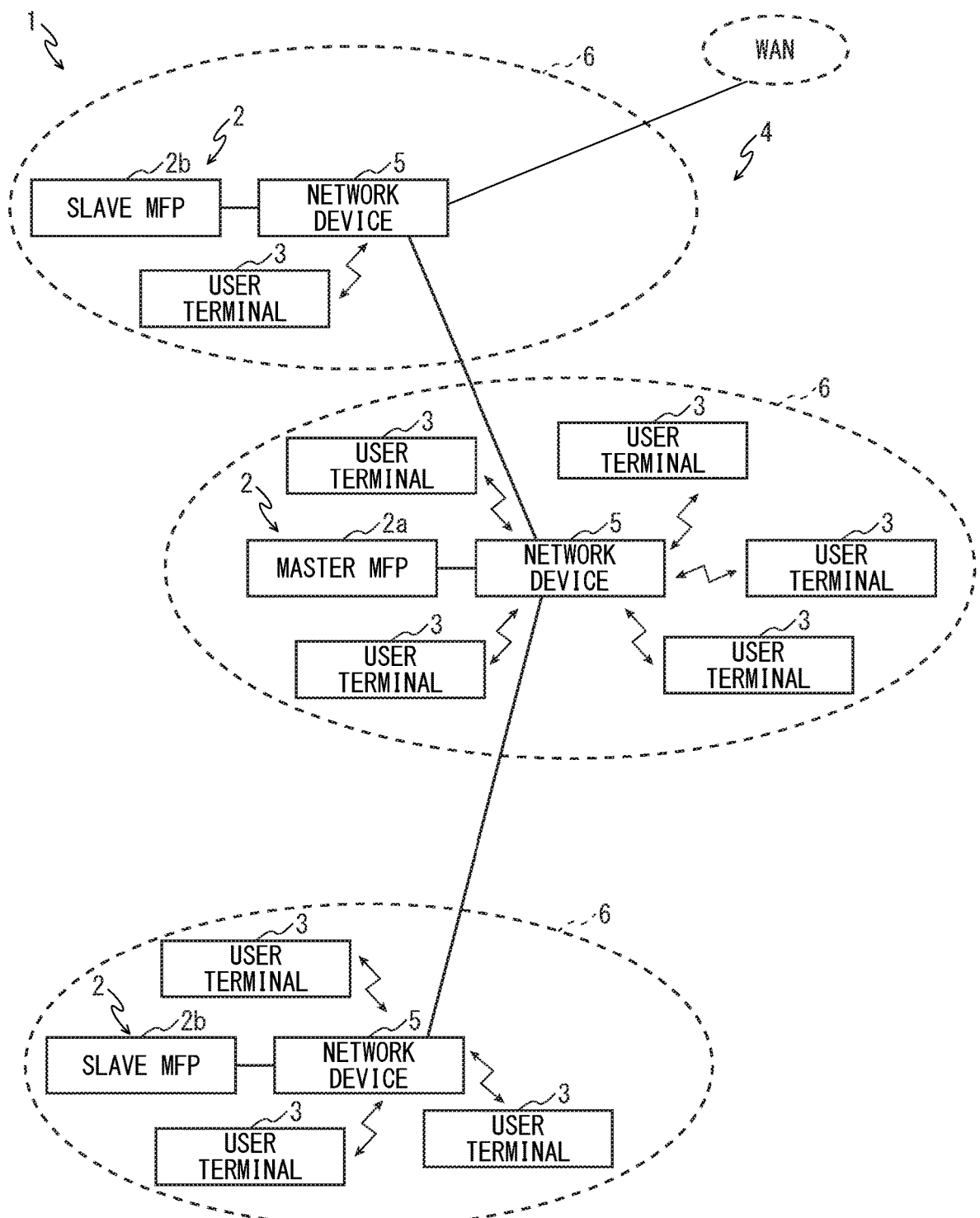
FIG. 1 is a block diagram schematically showing an image forming system according to an embodiment of the present disclosure.

First, an image forming system 1 according to an embodiment of the present disclosure will be described with reference to FIG. 1. The image forming system 1 includes a plurality of multifunction peripherals (MFPs) 2 as an image forming apparatus and one or more user terminals 3, such as a personal computer. The plurality of multifunction peripherals 2 are connected to each other via a predetermined network 4, such as an intracompany local area network (LAN). Each user terminal 3 is communicably connected to each multifunction peripheral 2 via the network 4.

The image forming system 1 includes a plurality of network devices 5, such as a network router or a hub, and each network device 5 composes each LAN (local area network) 6. The plurality of multifunction peripherals 2 are respectively connected to the plurality of network devices 5, each user terminal 3 may be connected any of the plurality of network devices 5. Each network device 5 is a communicating device for connecting the multifunction peripheral 2 or the user terminal 3 to each LAN 6, and may be configured to communicate by using which of wired or wireless. the plurality of network devices 5 are communicably connected to each other to compose the network 4 composed of a plurality of LANs 6. Incidentally, the network device 5 may be connected to the other network, such as a wide area network (WAN).

The plurality of multifunction peripherals 2 will be described. The plurality of multifunction peripherals 2 includes a master multifunction peripheral (MFP) 2a (a master image forming apparatus) as a managing device having a managing function and one or more slave multifunction peripherals (MFPs) 2b (slave image forming apparatuses) managed by the master multifunction peripheral 2a.

Figure 2:
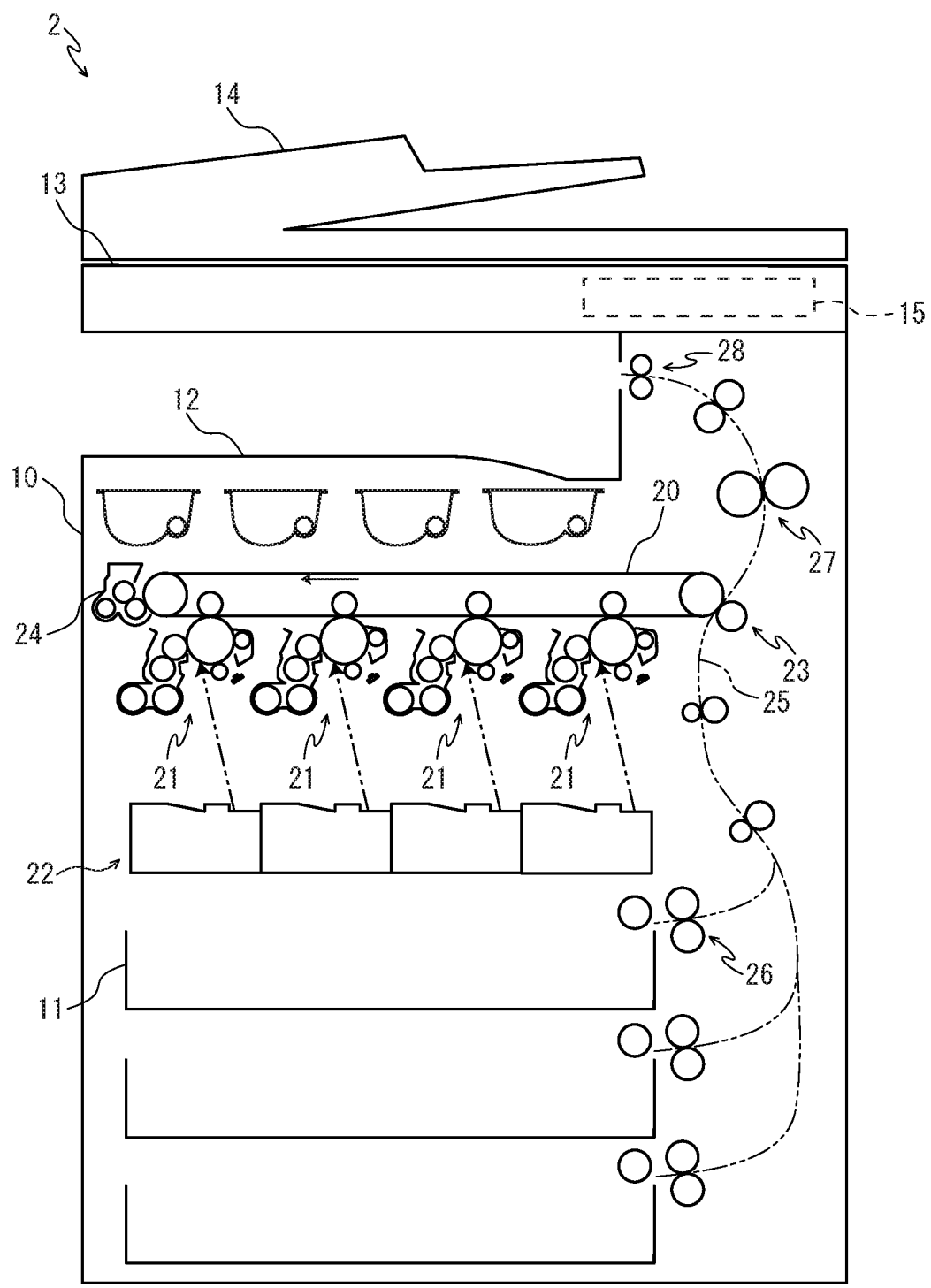
FIG. 2 is a sectional view schematically showing a multifunction peripheral in the image forming system according to the embodiment of the present disclosure.
Figure 3:
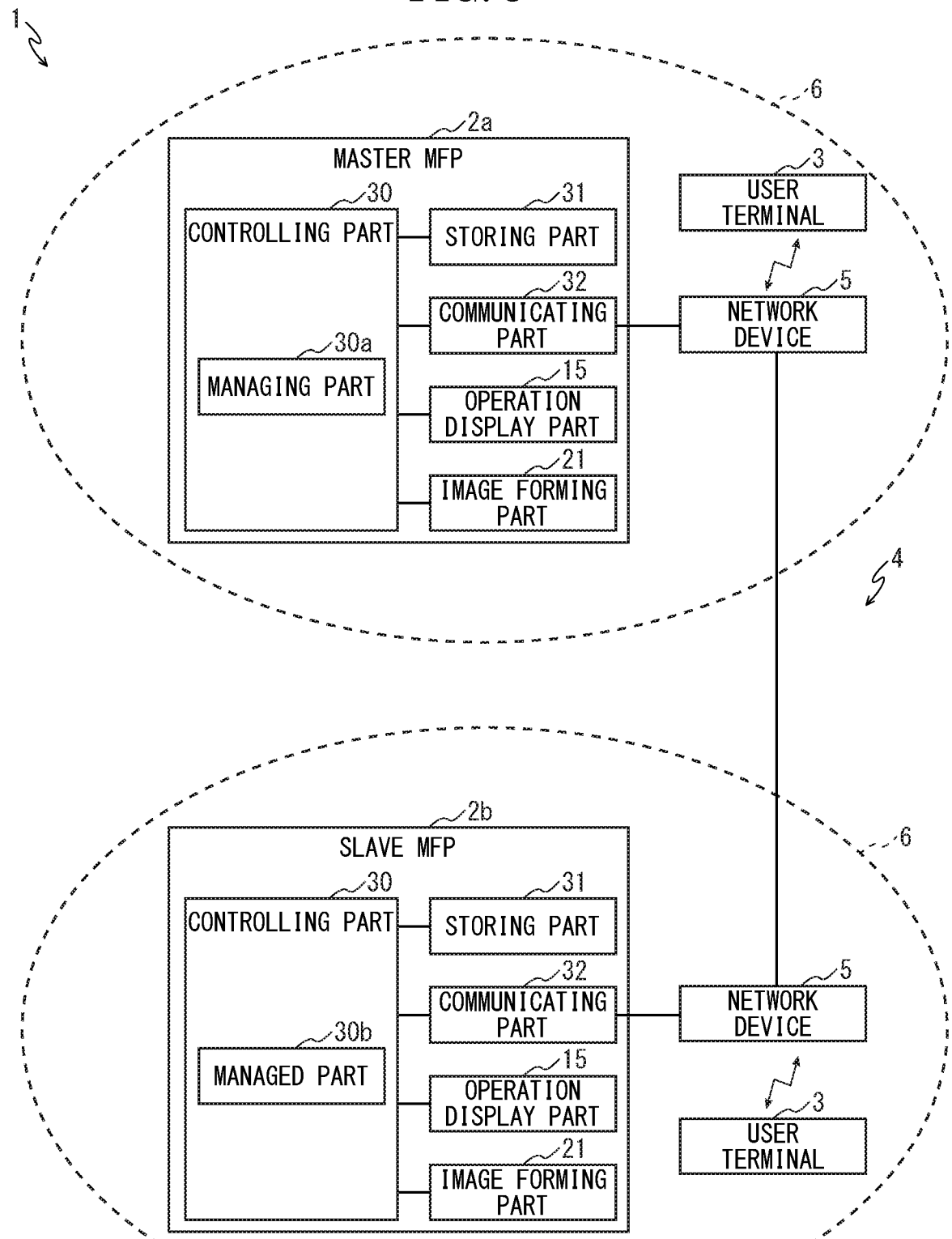
FIG. 3 is a block diagram showing the image forming system according to the embodiment of the present disclosure.

A common configuration of the master multifunction peripheral 2a and the slave multifunction peripherals 2b will be described as description of the multifunction peripheral 2 with reference to FIG. 2. Hereinafter, for convenience of description, it will be described so that the front side of the multifunction peripheral 2 is positioned at the near side on a paper sheet of FIG. 2. Arrows L, R, U and Lo in each FIG. respectively indicate a left side, a right side, an upper side and a lower side of the multifunction peripheral 2.

The multifunction peripheral 1 includes a roughly box-formed apparatus body 10. In a lower part of the apparatus body 10, a plurality of sheet feeding cartridges 11 storing sheets are provided. In an in-body space of an upper part of the apparatus body 2, an ejected sheet tray 12 is provided.

In the upper part of the apparatus body 10, an image forming part 13 reading a document to obtain image data is provided, and the image forming part 13 includes a platen glass and a reading slit on its upper face. Above the image forming part 13, a document conveying part 14 conveying the document to pass through the reading slit is provided. The image reading part 13 carries out image reading operation reading an image from the document placed on the platen glass or the document passing through the reading slit by a scanner to create the image data.

Further, in the upper part of the apparatus body 10, an operation display part 15 and a short range wireless communicating part 16 are attached at a front side. The operation display part 15 includes, for example, operation parts of various operation keys, such as ten keys, a start key and a system menu key, and others to receive operation of a user and a display device, such as a touch panel or a liquid crystal panel, to display various screens. The various operation keys may be provided in the touch panel.

In a central part of the apparatus body 10, an intermediate transferring belt 20 is windingly stretched among a plurality of conveying rollers. At a lower side of the intermediate transferring belt 20, four image forming parts 21 forming the image are provided for respective toner colors (for example, four colors of yellow, magenta, cyan and black). At a lower side of the four image forming parts 21, an exposing part 22 is provided. At a right end of the intermediate transferring belt 20, a secondary transferring part 23 is provided and, at a left end of the intermediate transferring belt 20, a cleaning unit 24 cleaning the intermediate transferring belt 20 is provided. The secondary transferring part 23 is composed of a part at a right end side of the intermediate transferring belt 20 and a secondary transferring roller.

In each image forming part 21, a photosensitive drum as an image carrier is rotatably provided. At the periphery of the photosensitive drum, a charging part, a developing part, a primary transferring part, a static eliminating part and a cleaning part are arranged in a sequential order of electrophotographic process. At an upper side of developing parts of the image forming parts 21, toner containers corresponding to respective image forming parts 21 are provided for the respective toner colors (for example, four colors of yellow, magenta, cyan and black). Each toner container contains the toner of each color.

At a right part in the apparatus body 20, a conveying path 25 for the sheet is provided. At an upstream part of the conveying path 25, a plurality of sheet feeding parts 26 are provided for the respective sheet feeding cartridges 11. At a middle stream part of the conveying path 25, the above-described secondary transferring part 23 is provided. At a downstream part of the conveying path 25, a fixing device 27 is provided and, at a downstream end of the conveying path 25, a sheet ejecting part 28 is provided.

The multifunction peripheral 2 is operated in an operation mode set from among a normal mode, a sleep mode with power consumption less than the normal mode and an energy saving mode with power consumption less than the sleep mode. The multifunction peripheral 2 in the normal mode sets the operation mode to the sleep mode when a predetermine period is elapsed without performing operation of the operation display part 15 or communication of a communicating part 32. Moreover, the multifunction peripheral 2 in the sleep mode sets the operation mode to the energy saving mode when a predetermine period is elapsed without performing operation of the operation display part 15 or communication of the communicating part 32. Incidentally, the multifunction peripheral 2 in the energy saving mode sets (returns) the operation mode to the sleep mode or the normal mode when operation of the operation display part 15 or communication of the communicating part 32 is performed. Moreover, the multifunction peripheral 2 in the sleep mode sets (returns) the operation mode to the normal mode when operation of the operation display part 15 or communication of the communicating part 32 is performed.

Next, image forming operation of the multifunction peripheral 2 will be described. The multifunction peripheral 2 in the normal mode starts the image forming operation when receiving an image output request from the user terminal 3. The multifunction peripheral 2 in the sleep mode or the energy saving mode returns to the normal mode when receiving the image output request from the user terminal 3, and then, starts the image forming operation.

In the image forming operation, first, in each image forming part 21, the photosensitive drum is electrically charged by the charging part, and then, exposed on the basis of the image data included in the image output request by the exposing part 22, and thereby, an electrostatic latent image is formed on the photosensitive drum. The electrostatic latent image on the photosensitive drum is developed for a toner image of each color by the developing part. The toner image of each color on the photosensitive drum is primarily transferred to a surface of the intermediate transferring belt 20 by the primary transferring part. The four image forming parts 21 sequentially perform the above-described operation, and thereby, a toner image of full color (a color toner image) is formed on the intermediate transferring belt 20. The color toner image is supplied to a secondary transferring part 23 at a predetermined secondary transfer timing by rotation of the intermediate transferring belt 20.

In addition, a sheet stored in the sheet feeding cartridge 11 is picked up by the sheet feeding part 26, and then, conveyed on the conveying path 25. The sheet on the conveying path 25 is conveyed to the secondary transferring part 23 at the predetermined secondary transfer timing described above. In the secondary transferring part 23, the color toner image on the intermediate transferring belt 20 is secondarily transferred to the sheet. The sheet having the secondarily transferred color toner image is conveyed to a downstream side on the conveying path 25 and, after the color toner image is fixed to the sheet by the fixing part 27, the sheet is ejected from the sheet ejecting part 28 to the ejected sheet tray 12.

Next, electric structure of the above-described multifunction peripheral 2 will be described with reference to FIG. 1. The multifunction peripheral 2 includes a controlling part 30 composed of a central processing unit (CPU) or the like, and a storing part 31 composed of a ROM, a RAM, an HDD and others inside the apparatus body 10. The controlling part 30 is connected to the storing part 31 and executes arithmetic process on the basis of control programs and control data stored in the storing part 31 to control each component of the multifunction peripheral 2 connected to the controlling part 30.

For example, the controlling part 30 is connected to each component, such as the operation display part 15 and the image forming parts 21, and controls the components. The controlling part 30 is connected to the communicating part 32, and the communicating part 32 is communicably connected to the network device 5 via the network 4.

Next, a different configuration of the master multifunction peripheral 2a and the slave multifunction peripherals 2b will be described with reference to a sequence chart FIG. 4. The controlling part 30 of the master multifunction peripheral 2a works as a managing part 30a managing the slave multifunction peripherals 2b by executing a managing program stored in the storing part 31. The controlling part 30 of the slave multifunction peripheral 2b works as a managed part 30b receiving management of the master multifunction peripheral 2a by executing a managed program stored in the storing part 31.

An example of a function of the managing part 30a of the master multifunction peripheral 2a will be described. In the LAN 6 to which each slave multifunction peripheral 2b is connected, in a case where the number of the user terminals 3 connected the slave multifunction peripheral 2b to the is less than a predetermined threshold value, the managing part 30a forcibly shifts the slave multifunction peripheral 2b to the energy saving mode and fixes the slave multifunction peripheral 2b to the energy saving mode.

Concretely, the managing part 30a communicates with each slave multifunction peripheral 2b or each network device 5 to which each slave multifunction peripheral 2b is connected to obtain connection information relating to connection of each slave multifunction peripheral 2b to the LAN 6 (refer to step S1 in FIG. 4). The connection information of each slave multifunction peripheral 2b may be, for example, network device information, such as a device name or a MAC address, of the network device 5 to which each slave multifunction peripheral 2b is connected and LAN information, such as a network name, of the LAN 6 to which each slave multifunction peripheral 2b is connected.

Moreover, the managing part 30a communicates with each user terminal 3 to obtain position information relating to connection of each user terminal 3 to the LAN 6 (refer to step S2 in FIG. 4). Similar to the connection information of each slave multifunction peripheral 2b, the position information of each user terminal 3 may be, for example, network device information, such as a device name or a MAC address, of the network device 5 to which each user terminal 3 is connected and LAN information, such as a network name, of the LAN 6 to which each user terminal 3 is connected.

Subsequently, the managing part 30a detects the user terminals 3 connected to the same LAN 6 as each slave multifunction peripheral 2b on the basis of the connection information of each slave multifunction peripheral 2b and the position information of each user terminal 3, and counts the number of the detected user terminals 3. In a case where the number of the user terminals 3 connected to the same LAN 6 as each slave multifunction peripheral 2b is less than a predetermined threshold value (refer to step S3 in FIG. 4), the managing part 30a transmits an energy saving shift instruction to the slave multifunction peripheral 2b (refer to step S4 in FIG. 4). Thereby, the managing part 30a forcibly shifts the slave multifunction peripheral 2b to the energy saving mode and fixes the slave multifunction peripheral 2b to the energy saving mode (refer to step S5 in FIG. 4).

Further, the managing part 30a transmits an energy saving release instruction to the slave multifunction peripheral 2b fixed to the energy saving mode as needed, and then, releases fixing of the slave multifunction peripheral 2b to the energy saving mode to shift the slave multifunction peripheral 2b to the sleep mode or the normal mode.

For example, in a case where the number of the user terminals 3 connected to the same LAN 6 as the slave multifunction peripheral 2b fixed to the energy saving mode becomes equal to or more the predetermined threshold value, the managing part 30a transmits the energy saving release instruction to the slave multifunction peripheral 2b.

Moreover, in a case where the slave multifunction peripheral 2b fixed to the energy saving mode (called as a first slave multifunction peripheral 2b) performs the image forming operation (i.e. a print job including image data or output data) in accordance with the image output request from the user terminal 3, the managing part 30a transmits the energy saving release instruction to the first slave multifunction peripheral 2b.

Concretely, when the first slave multifunction peripheral 2b receives the image output request from the user terminal 3 (refer to step S11 in FIG. 4), the first slave multifunction peripheral 2b transmits an image output request notification indicating receiving of the image output request to the master multifunction peripheral 2a (refer to step S12 in FIG. 4), and then, the managing part 30a receives the image output request notification. At this time, although the user terminal 3 transmits the image output request to the first slave multifunction peripheral 2b as an image output destination, in order to perform the image forming operation in accordance with the image output request, the first slave multifunction peripheral 2b must returns from the energy saving mode to the normal mode. However, even if returning operation of the first slave multifunction peripheral 2b is not performed, the image output request may be performed in the other slave multifunction peripheral 2b (called as a second slave multifunction peripheral 2b).

Thereupon, the managing part 30*a* detects the second slave multifunction peripheral 2*b* as image output destination candidate instead of the first slave multifunction peripheral 2*b* in accordance with the image output request notification (refer to step S13 in FIG. 4) and transmits candidate information (e.g. a name of the multifunction peripheral 2 and a name of the LAN 6) of the second slave multifunction peripheral 2*b* to the first slave multifunction peripheral 2*b* (refer to step S14 in FIG. 4). Incidentally, the first slave multifunction peripheral 2*b* makes the user terminal 3 select any of the first slave multifunction peripheral 2*b* and the second slave multifunction peripheral 2*b* as the image output destination of the image output request as described later.

The managing part 30*a* preferably detects, as the second slave multifunction peripheral 2*b*, the slave multifunction peripheral 2*b* set to the operation mode other than the energy saving mode out of the slave multifunction peripherals 2*b* other than the first slave multifunction peripheral 2*b*. Moreover, the managing part 30*a* preferably detects, as the second slave multifunction peripheral 2*b*, the slave multifunction peripheral 2*b* located in the vicinity of the first slave multifunction peripheral 2*b* or the slave multifunction peripheral 2*b* located in the vicinity of the user terminal 3 on the basis of the connection information of each slave multifunction peripheral 2*b* or the position information of the user terminal 3 having transmitted the image output request. Further, the managing part 30*a* refers print setting (e.g. a sheet size) of the image output request transmitted by the user terminal 3 and preferably detects, as the second slave multifunction peripheral 2*b*, the slave multifunction peripheral 2*b* having performance capable of outputting the image output request on the basis of the print setting.

In a case where the user terminal 3 selects the first slave multifunction peripheral 2*b* as the image output destination of the image output request, the managing part 30*a* receives a release request from the user terminal 3 or the first slave multifunction peripheral 2*b* (refer to step S18 in FIG. 4) and responds to the release request to transmit the energy saving release instruction to the first slave multifunction peripheral 2*b* (refer to step S19 in FIG. 4).

On the other hand, in a case where the user terminal 3 selects the second slave multifunction peripheral 2*b* as the image output destination of the image output request, the managing part 30*a* receives the image output request from the user terminal 3 or the first slave multifunction peripheral 2*b* and transfers the image output request to the second slave multifunction peripheral 2*b*. Incidentally, if the user terminal 3 or the first slave multifunction peripheral 2*b* transmits the image output request to the second slave multifunction peripheral 2*b*, such transferring process is not required.

Incidentally, the managing part 30*a* may grasp transmission condition of the energy saving shift instruction and the energy saving release instruction to the slave multifunction peripheral 2*b* and stores information whether or not each slave multifunction peripheral 2*b* is fixed to the energy saving mode in the storing part 31. Moreover, the managing part 30*a* may receive the operation mode set in each slave multifunction peripheral 2*b* from each slave multifunction peripheral 2*b* and stores the operation mode in the storing part 31 to grasp the operation mode in each slave multifunction peripheral 2*b*.

An example of a function of the managed part 30*b* of the slave multifunction peripheral 2*b* will be described. When the managed part 30*b* receives the energy saving shift instruction from the managing part 30*a* of the master multifunction peripheral 2*a*, the managed part 30*b* forcibly sets the operation mode to the energy saving mode and fixes to the energy saving mode. Moreover, when the managed part 30*b* receives the energy saving release instruction from the managing part 30*a* of the master multifunction peripheral 2*a*, the managed part 30*b* releases fixing of the energy saving mode (refer to step S20 in FIG. 4).

For example, the managed part 30*b* stores an operation mode fixing flag in the storing part 31 and, in a case where the operation mode fixing flag is ON, disables change of the operation mode regardless operation of the operation display part 15 or communication of the communicating part 32. Moreover, in a case where the operation mode fixing flag is OFF, the managed part 30*b* enables change of the operation mode in accordance with operation of the operation display part 15 or communication of the communicating part 32. Thereupon, the managed part 30*b* sets the operation mode fixing flag to ON in accordance with the energy saving shift instruction, while sets the operation mode fixing flag to OFF in accordance with the energy saving release instruction.

Moreover, when the managed part 30*b* of the slave multifunction peripheral 2*b* set to the energy saving mode receives the image output request from the user terminal 3, the managed part 30*b* transmits the image output request notification indicating receiving of the image output request from the user terminal 3 to the master multifunction peripheral 2*a* without returning to the sleep mode or the normal mode and performing the above-described image forming operation. Incidentally, the image output request notification may include terminal information of the user terminal 3 having transmitted the image output request.

As response to the image output request notification, the managed part 30*b* receives candidate information of the above-described second slave multifunction peripheral 2*b* from the master multifunction peripheral 2*a* as the image output destination candidate instead of its own slave multifunction peripheral 2*b* (the first slave multifunction peripheral 2*b*).

Subsequently, the managed part 30*b* transmits an output destination selection request for making the user select any of the first slave multifunction peripheral 2*b* and the second slave multifunction peripheral 2*b* as the image output destination to the user terminal 3 (refer to step S15 in FIG. 4). The managed part 30*b* instructs the user terminal 3 by the output destination selection request to display a selection screen of the image output destination. The output destination selection request may include information indicating that the first slave multifunction peripheral 2*b* is set to the energy saving mode and information of the first slave multifunction peripheral 2*b* and the second slave multifunction peripheral 2*b*.

The user terminal 3 having received the output destination selection request displays an operable selection screen on a display device of the user terminal 3 and the operable selection screen displays an indication that the first slave multifunction peripheral 2*b* is set to the energy saving mode and displays a selector capable of selecting the first slave multifunction peripheral 2*b* and the second slave multifunction peripheral 2*b*. For example, on the selection screen, a selection key for selecting the first slave multifunction peripheral 2*b* and the second slave multifunction peripheral 2*b* as the image output destination is displayed. When the first slave multifunction peripheral 2*b* is selected (refer to step S16 in FIG. 4), the user terminal 3 transmits selection response indicating the first slave multifunction peripheral 2*b* as the image output destination to the first slave multifunction peripheral 2*b* (refer to step S17 in FIG. 4). On the other hand, when the second slave multifunction peripheral 2*b* is selected (refer to step S22 in FIG. 4), the user terminal 3 transmits selection response indicating the second slave multifunction peripheral 2b as the image output destination to the first slave multifunction peripheral 2b (refer to step S23 in FIG. 4).

The managed part 30b of the first slave multifunction peripheral 2b receives the selection response from the user terminal 3 and, in a case where the selection response indicates the first slave multifunction peripheral 2b, transmits the release request to the master multifunction peripheral 2a (refer to step S18 in FIG. 4). Moreover, the managed part 30b receives the energy saving release instruction from the master multifunction peripheral 2a having responded to the release request (refer to step S19 in FIG. 4), sets the operation mode fixing flag to OFF, and return the operation mode to the normal mode (refer to step S20 in FIG. 4). After that, the managed part 30b of the first slave multifunction peripheral 2b performs the image forming operation with regard to the image output request received from the user terminal 3 (refer to step S21 in FIG. 4).

On the other hand, in a case where the selection response received from the user terminal 3 indicates the second slave multifunction peripheral 2b, the managed part 30b may transmit the image output request from the user terminal 3 to the master multifunction peripheral 2a to transmit image output request to the second slave multifunction peripheral 2b via the master multifunction peripheral 2a (refer to steps S24 and S25 in FIG. 4) or may directly transmit the image output request to the second slave multifunction peripheral 2b. Incidentally, the managed part 30b may transmit an image output destination determination notification indicating that the image output destination of the image output request from the user terminal 3 is the second slave multifunction peripheral 2b to the master multifunction peripheral 2a or the second slave multifunction peripheral 2b in advance. After that, the managed part 30b of the second slave multifunction peripheral 2b performs the image forming operation with regard to the image output request received from the user terminal 3 (refer to step S26 in FIG. 4).

Although the above-described embodiment was described about an example that the first slave multifunction peripheral 2b set to the energy saving mode transmits the image output request notification to the master multifunction peripheral 2a while maintaining the energy saving mode when receiving the image output request from the user terminal 3, the present disclosure is not limited by this example. For example, in the other embodiment, in a case where the first slave multifunction peripheral 2b disables communication in the energy saving mode, the first slave multifunction peripheral 2b may shift to the sleep mode or the other communicable state, and then, transmits the image output request notification when receiving the image output request. Subsequently, the first slave multifunction peripheral 2b maintains the sleep mode or the communicable state until receiving the above-described selection response from the user terminal 3, and then, in a case where the received selection response indicates the first slave multifunction peripheral 2b, returns the operation mode to the normal mode. On the other hand, in a case where the received selection response indicates the second slave multifunction peripheral 2b, the first slave multifunction peripheral 2b transmits the image output request and the image output destination determination notification to the master multifunction peripheral 2a or the second slave multifunction peripheral 2b, and then, returns to the energy saving mode.

In accordance with the embodiment, as described above, the image forming system 1 includes the one or more slave multifunction peripherals 2b (the image forming apparatuses) connected to the predetermined network 4, the master multifunction peripheral 2a (the managing device) connected to the network 4 and being communicable with the one or more slave multifunction peripherals 2b, and the one or more user terminals 3 being communicable with the network 4. The one or more slave multifunction peripherals 2b are respectively connected to one or more LANs 6 in the network 4. Each slave multifunction peripheral 2b is set to any operation mode of the normal mode, the sleep mode with power consumption less than the normal mode and an energy saving mode with power consumption less than the sleep mode. The master multifunction peripheral 2a counts the number of the user terminals 3 connected to the same LAN 6 as the slave multifunction peripheral 2b and, in a case where the counted number is less than the predetermined threshold value, transmits the energy saving shift instruction to the slave multifunction peripheral 2b. The slave multifunction peripheral 2b sets the operation mode to the energy saving mode, in a case of receiving the energy saving shift instruction from the master multifunction peripheral 2a.

Thereby, in the image forming system 1, since the slave multifunction peripheral 2b with a low use frequency is automatically set to the energy saving mode, it is possible to reduce power consumption. Therefore, it is possible to improve energy saving efficiency of the plurality of multifunction peripherals connected to the network 4.

Moreover, in the embodiment, the master multifunction peripheral 2a obtains the connection information relating to the LAN 6 with regard to the slave multifunction peripheral 2b, obtains the one or more position information relating to the LAN 6 with regard to the one or more user terminals 3, and detects the user terminals 3 connected to the same LAN 6 as the slave multifunction peripheral 2b on the basis of the connection information of the slave multifunction peripheral 2b and the one or more position information of the one or more user terminals 3 to count the number of the detected user terminals 3.

Thereby, even if connection of the user terminal 3 is switched on the LAN 6 to which the slave multifunction peripheral 2b is connected, it is possible to appropriately detect the user terminal 3 connected to the LAN 6.

Moreover, in the embodiment, the slave multifunction peripheral 2b is fixed to the energy saving mode, in a case of setting the operation mode to the energy saving mode in accordance with the energy saving shift instruction from the master multifunction peripheral 2a, while releases fixing of the energy saving mode, in a case of receiving the energy saving release instruction from the master multifunction peripheral 2a.

Thereby, since returning operation of the slave multifunction peripheral 2b with a low use frequency is restrained by the master multifunction peripheral 2a, it is possible to control power consumption of the returning operation by the master multifunction peripheral 2a.

Moreover, in the embodiment, the master multifunction peripheral 2a transmits the energy saving release instruction to the slave multifunction peripheral 2b, in a case where the number of the user terminals 3 connected to the same LAN 6 as the slave multifunction peripheral 2b fixed to the energy saving mode is equal to or more the predetermined threshold value.

Thereby, when connection of the user terminals 3 to the slave multifunction peripheral 2b is reduced due to a meeting, going out or the like and a use frequency of the slave multifunction peripheral 2b is temporarily lowered, the slave multifunction peripheral 2b is set to the energy saving mode to restrain power consumption. On the other hand, when the user terminals 3 came back from the meeting, going out or the like are connected to the slave multifunction peripheral 2b, the slave multifunction peripheral 2b releases fixing of the energy saving mode, and thereby, it is possible to use the slave multifunction peripheral 2b as usual.

Moreover, in the embodiment, the first slave multifunction peripheral 2b fixed to the energy saving mode transmits the image output request notification to the master multifunction peripheral 2a when receiving the image output request from the user terminal 3. The master multifunction peripheral 2a detects, as the image output destination candidate, the second slave multifunction peripheral 2b set to the operation mode other than the energy saving mode out of the slave multifunction peripherals 2b other than the first slave multifunction peripheral 2b, and transmits the image output destination candidate to the first slave multifunction peripheral 2b. The first slave multifunction peripheral 2b transmits the output destination selection request for making the user select any of the first slave multifunction peripheral 2b and the second slave multifunction peripheral 2b as the image output destination to the user terminal 3. When the first slave multifunction peripheral 2b is selected as the image output destination, the master multifunction peripheral 2a transmits the energy saving release instruction to the first slave multifunction peripheral 2b and the first slave multifunction peripheral 2b sets the operation mode to the normal mode in accordance with the energy saving release instruction to output the image in accordance with the image output request. On the other hand, when the second slave multifunction peripheral 2b is selected as the image output destination, the first slave multifunction peripheral 2b transmits the image output request to the second slave multifunction peripheral 2b and the second slave multifunction peripheral 2b outputs the image in accordance with the image output request.

Thereby, in a case where the energy saving mode is set in the first slave multifunction peripheral 2b being a transmission destination of the image output request, the user terminal 3 becomes capable of selecting any of the first slave multifunction peripheral 2b and the second slave multifunction peripheral 2b. Therefore, in a case where the user desires image output of the first slave multifunction peripheral 2b as usual regardless power consumption, the user can select the first slave multifunction peripheral 2b as the image output destination. In addition, in a case where the user desires to restrain power consumption regardless the image output destination, the user can select the second slave multifunction peripheral 2b as the image output destination without redoing the image output request.

Incidentally, although the above-described embodiment was described about an example that the master multifunction peripheral 2a is provided as the managing device managing the slave multifunction peripheral 2b, the present disclosure is not limited by this example. For example, in a further example, the managing device may be configured by a server or the other device instead of the master multifunction peripheral 2a.

Incidentally, although the above-described embodiment was described about an example that the slave multifunction peripheral 2b is fixed to the energy saving mode in a case where the number of the user terminals 3 connected to the same LAN 6 as the slave multifunction peripheral 2b is less than the predetermined threshold value, the present disclosure is not limited by this example. For example, in a further example, if the slave multifunction peripheral 2b is configured so as to be capable of controlling ON/OFF of a power source, the slave multifunction peripheral 2b may be controlled so as to switch the power source to OFF, in a case where the number of the user terminals 3 connected to the same LAN 6 as the slave multifunction peripheral 2b is less than the predetermined threshold value.

Although the above-described embodiment was described about a case of applying the configuration of the present disclosure to the image forming system 1 including the multifunction peripherals 2, in a further different embodiment, the configuration of the present disclosure may be applied to the other image forming system including the other image forming apparatus, such as a printer, a copying machine or a facsimile.

Incidentally, the description of the embodiment is one example of the image forming system according to the present disclosure, but the technical scope of the present disclosure is not limited to the embodiment.

The invention claimed is:
1. An image forming system comprising:
one or more image forming apparatuses connected to a predetermined network;
a managing device connected to the network and being communicable with the one or more image forming apparatuses; and
one or more user terminals being communicable with the network,
wherein the one or more image forming apparatuses are respectively connected to one or more local area networks in the network,
each image forming apparatus is set to any operation mode of a normal mode, a sleep mode with power consumption less than the normal mode and an energy saving mode with power consumption less than the sleep mode,
the managing device counts the number of the user terminals connected to the same local area network as each image forming apparatus and, in a case where the counted number is less than a predetermined threshold value, transmits an energy saving shift instruction to each image forming apparatus,
each image forming apparatus sets the operation mode to the energy saving mode, in a case of receiving the energy saving shift instruction from the managing device,
each image forming apparatus is fixed to the energy saving mode, in a case of setting the operation mode to the energy saving mode in accordance with the energy saving shift instruction from the managing device, while releases fixing of the energy saving mode, in a case of receiving an energy saving release instruction from the managing device,
the one or more image forming apparatuses includes a first image forming apparatus fixed to the energy saving mode and a second image forming apparatus set to the operation mode other than the energy saving mode out of the image forming apparatuses other than the first image forming apparatus,
the first image forming apparatus transmits an image output request notification to the managing device when receiving an image output request from the user terminal,
the managing device detects, as an image output destination candidate, the second image forming apparatus, and transmits the image output destination candidate to the first image forming apparatus, the first image forming apparatus transmits an output destination selection request for making a user select any of the first image forming apparatus and the second image forming apparatus as an image output destination to the user terminal, when the first image forming apparatus is selected as the image output destination, the managing device transmits the energy saving release instruction to the first image forming apparatus, and the first image forming apparatus sets the operation mode to the normal mode in accordance with the energy saving release instruction to output an image in accordance with the image output request, on the other hand, when the second image forming apparatus is selected as the image output destination, the first image forming apparatus transmits the image output request to the second image forming apparatus, and the second image forming apparatus outputs the image in accordance with the image output request.

2. The image forming system according to claim 1, wherein the managing device obtains connection information relating to the local area network with regard to each image forming apparatus, obtains one or more position information relating to the local area network with regard to the one or more user terminals, and detects the user terminals connected to the same local area network as each image forming apparatus on the basis of the connection information of each image forming apparatus and the one or more position information of the one or more user terminals to count the number of the detected user terminals.

3. The image forming system according to claim 1, wherein the managing device transmits the energy saving release instruction to each image forming apparatus, in a case where the number of the user terminals connected to the same local area network as each image forming apparatus fixed to the energy saving mode is equal to or more the predetermined threshold value.

4. The image forming system according to claim 1, wherein the managing device detects the second image forming apparatus located in the vicinity of the first image forming apparatus or the second image forming apparatus located in the vicinity of the user terminal on the basis of the connection information of the second image forming apparatus or the position information of the user terminal having transmitted the image output request.

5. The image forming system according to claim 1, wherein the managing device refers print setting of the image output request transmitted by the user terminal and detects the second image forming apparatus having performance capable of outputting the image output request on the basis of the print setting.

6. The image forming system according to claim 1, wherein each image forming apparatus is configured by a slave image forming apparatus, the managing device is configured by a master image forming apparatus.

7. The image forming system according to claim 1, wherein the managing device is configured by a server.

* * * * *